United States Patent
Zharnikov et al.

(10) Patent No.: US 9,081,121 B2
(45) Date of Patent: Jul. 14, 2015

(54) METHOD FOR A MUD CAKE THICKNESS DETERMINATION

(75) Inventors: Timur Zharnikov, Moscow (RU); Masafumi Fukuhara, Moscow (RU); Alexander F. Zazovsky, Houston, TX (US); Fernando Garcia-Osuna, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 845 days.

(21) Appl. No.: 13/311,864

(22) Filed: Dec. 6, 2011

(65) Prior Publication Data

US 2012/0170405 A1 Jul. 5, 2012

(30) Foreign Application Priority Data

Dec. 30, 2010 (RU) .................................. 2010154216

(51) Int. Cl.
*G01V 1/50* (2006.01)

(52) U.S. Cl.
CPC ........................................ *G01V 1/50* (2013.01)

(58) Field of Classification Search
CPC ....................................................... G01V 1/50
See application file for complete search history.

(56) References Cited

U.S. PATENT DOCUMENTS

| 4,365,321 | A | * | 12/1982 | von Bose ......................... 367/25 |
| 4,780,858 | A | | 10/1988 | Clerke |
| 5,763,773 | A | | 6/1998 | Birchak et al. |
| 2002/0070017 | A1 | | 6/2002 | Soliman et al. |
| 2003/0024316 | A1 | * | 2/2003 | Han et al. ......................... 73/629 |
| 2008/0224705 | A1 | * | 9/2008 | Simon et al. .................. 324/333 |

FOREIGN PATENT DOCUMENTS

| WO | 02068796 A1 | 9/2002 |
| WO | 2009139992 A2 | 11/2009 |

OTHER PUBLICATIONS

Search Report of European Patent Application No. 11250935.1 dated Mar. 38, 2012: pp. 1-4.

* cited by examiner

*Primary Examiner* — Isam Alsomiri
*Assistant Examiner* — Hovhannes Baghdasaryan

(57) ABSTRACT

The method of a mud cake thickness determination provides sending short high-frequency signals into a formation from at least two positions located at different distances from the mud cake and recording arrival times of reflected echo signals. The mud cake thickness is determined based on the time measured.

8 Claims, 3 Drawing Sheets

METHOD FOR A MUD CAKE THICKNESS DETERMINATION

TECHNICAL FIELD

This invention is related to the methods of the determination of the mud cake formed during drilling.

BACKGROUND

A mud cake is formed during drilling with the drilling mud injected onto the well via drill string and drawn off via the openings in the drill bit to provide lubrication during the drilling and drilled-out rock debris wash-over to the surface. The mud cake layer is formed as the drilling mud is mixed with the rock debris and/or other solid substances and circulated upwards via the annular area between the drill string outer surface and borehole wall. The mixture covers the borehole wall and forms the mud cake layer. One of the functions of the mud cake layer is insulation of the bed from the borehole inner part. The mud cake layer is in the industry often referred to as the mud cake or filter cake.

A method for direct determination of mud cake characteristics during sampling performed during the drilling process is known. The method is described in WO 2009/139992. In the known method pulse-echo measurements were performed using a high-frequency acoustic detector, and to evaluate the mud cake thickness data of the signal emitted and echo returned were used. To determine the mud cake thickness as per this method the sound speed in the mud cake must be known which in practice is usually impossible.

SUMMARY

The suggested method for a mud cake thickness determination provides improved reliability and accuracy and comprises the following. Short-time high-frequency signals are sent into a formation from at least two positions located at different distances from a mud cake, reflected echo-signals' arrival times are recorded and a mud cake thickness is determined based on the times measured. Such high-frequency signals are sent by one source of high-frequency signals moving to different positions against the mud cake or by means of at least two sources installed at different distances from the mud cake.

As the high-frequency signals' source contact transducers, refracted ray transducers, shear wave transducers, hydrophone receivers etc. may be used.

A source of high-frequency signals can be at the same time used as an acoustic receiver.

Additionally an attenuation in the mud cake can be determined and/or a spectral analysis of echo signals can be conducted.

BRIEF DESCRIPTION OF THE DRAWINGS

The invention is explained by drawings in which.

DETAILED DESCRIPTION

In the known method of the mud cake thickness determination described in WO 2009/139992B echo-pulse measurements were used to evaluate a mud cake thickness $h_{mc}$ and the $h_{mc}$ was evaluated based on the echo arrival time data:

$$h_{mc} = V_{mc} t / 2$$

where $V_{mc}$ is the sound speed in the mud cake, and t—the time of the signal propagation in the mud cake. To implement this method $V_{mc}$ be known. It would also be preferable to use signal frequency f values around $f = V_{mc}/2h_{mc}$ and higher. Unfortunately, in practice the sound speed in the mud cake is usually unknown.

Figure 1:
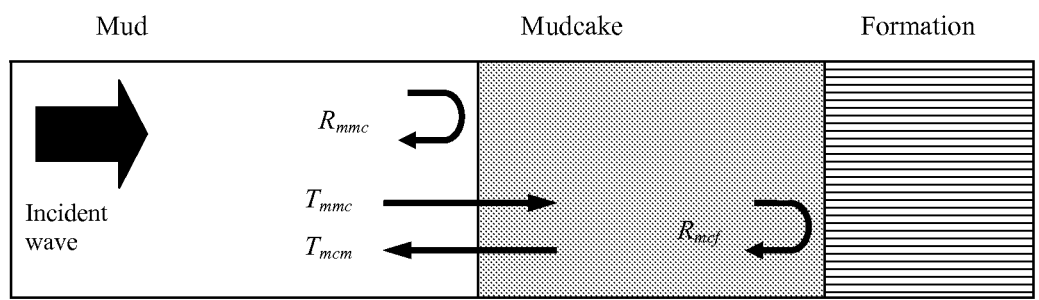
FIG. 1 illustrates sending and reflection of a signal at the drilling mud/mud cake interface.

To solve this problem it is proposed to send short-time high-frequency signals into a formation and listen for echo for different locations of a high-frequency signals source relative to a mud cake. One of the embodiments consists in sending short-time high-frequency signals into the formation at certain time intervals varying the distance from the source to the mud cake by relocating a source of high-frequency signals. The other embodiment consists in disposing at least two sources of high-frequency signals at different distances between them and the mud cake. The idea is to use the reflections from the interfaces (both drilling mud/mud cake and mud cake/formation ones) as well as in the use of not only echo arrival time but also complete data of the signal (see FIG. 1) (for example, reflection amplitudes). Real muds and mudcakes strongly attenuate acoustic waves. In effect, due to the attenuation the echo may not appear until a transducer is close enough to the mud cake surface. Quantitatively the attenuation is characterized by the attenuation decrement $\delta$. Over one distance equal to the wave length the wave amplitude reduced by factor of $e^{-\delta}$. It means that the wave amplitude with the frequency f at the distance of d reduces by factor of $$D(d) = e^{-\delta \frac{d}{\lambda}} = e^{-\delta \frac{fd}{V}}.$$

There are several unknown values—$\delta_m$, $h_{mc}$, $V_{mc}$. If the echo arrival time is known it should be possible to evaluate only one of them. Consequently, additional information is required—two independent values minimum. These are the wave amplitude decay when the transducer position is changed and drilling mud/mud cake reflection coefficient.

The algorithm is as follows. The signal transmission and reflection coefficients when a wave passes from medium 1 to medium 2 are expressed as:

$$R_{12} = \frac{Z_2 - Z_1}{Z_2 + Z_1}; T_{12} = \frac{2Z_2}{Z_1 + Z_2}$$

where $Z = \rho V$ means complete acoustic impedance of the medium. If R is negative, it means that $\pi$-phase shift of the reflected wave relative to the incident wave takes place.

We consider three different cases: reflection from drilling mud/mud cake interface when the source is at a distance from it (1), reflection from mud cake/formation interface when the source is pressed to the mud cake (2) and reflection from mud cake/formation interface when the source is at a distance from the mud cake (3). In all these options the wave propagates via the medium with the attenuation and is reflected/transmitted at the interfaces. The resulting amplitude reduction after the first wave return will be as follows (see FIG. 1):

$$K_{mmc} = R_{mmc}D_m^2 = \frac{Z_{mc} - Z_m}{Z_{mc} + Z_m}e^{-\delta_m \frac{2fd_m}{V_m}}$$

$$K_{mcf} = R_{mcf}D_{mc}^2 = \frac{Z_f - Z_{mc}}{Z_f + Z_{mc}}e^{-\delta_{mc}\frac{2fh_{mc}}{V_{mc}}}$$

$$K_{mf} = T_{mmc}R_{mcf}T_{mcm}D_m^2D_{mc}^2 = \frac{4Z_mZ_{mc}}{(Z_m + Z_{mc})^2}\frac{Z_f - Z_{mc}}{Z_f + Z_{mc}}e^{-\delta_m\frac{2fd_m}{V_m}}e^{-\delta_{mc}\frac{2fh_{mc}}{V_{mc}}}$$

where $d_m$ is the distance between the transducer and drilling mud/mud cake interface. These equations are written for 1D case, which is true for our measurements due to the small size of the transducer and mud cake thickness as compared with the borehole radius. The sound speed in the drilling mud $V_m$ and its density $\rho_m$ may be considered as known values proceeding, at least, from the drilling mud composition or by means of installing an additional borehole sensor. The drilling mud attenuation decrement $\delta_m$ may be assumed as known (i.e., based on the additional sensor data). Alternatively, it may be estimated through step-by-step echo-pulse measurements at the known sensor position because impedance at the drilling mud/mud cake interface does not change. In case of using more than one source the difference in positions is known and in case of moving source it can be done by, for example, installing position sensors on the motor. Due to the echo-pulse measurements at the distances of $d_{m1}$ and $d_{m2}$ and obtaining the ratio between them $\delta_m$ may be estimated:

$$\delta_m = -\frac{V_m}{2f(d_{m1} - d_{m2})}\ln A(d_{m1})/A(d_{m2})$$

where A (d) is the amplitude of the signal reflected from the drilling mud/mud cake interface providing that the source is at the distance of d from it. Then from the echo signal from the drilling mud/mud cake interface the mud cake impedance $Z_{mc}$ may be inferred because the drilling mud impedance $Z_m$ is known:

$$Z_{mc} = Z_m\frac{1+\gamma}{1-\gamma}, \text{ где}$$

$$\gamma = K_{mmc}(d_m)\exp\left(\delta_m\frac{2fd_m}{V_m}\right),$$

or, in a more convenient form $$\gamma = K_{mmc}(d_m)\exp\left(\frac{d_m}{d_{m2}-d_{m1}}\frac{\ln A_{m1}}{\ln A_{m2}}\right)$$

The mud cake density $\rho_{mc}$ may be estimated with the reasonable accuracy (30-40%), if the weighting additive is known and an admission of the mud cake average density is made. It enables estimation of the sound speed in the mud cake as $V_{mc} = Z_{mc}/\rho_{mc}$. The mud cake/formation echo signals may be identified by eliminating the drilling mud-mud cake echo and its multiples. Knowing arrival time of these echoes and the sound speed in the drilling mud and mud cake it is easy to get estimate $h_{mc}$ estimate. An additional advantage of this approach consists in the fact that attenuation in the mud cake may also be estimated. It may be done if the formation impedance $Z_f$ is known (for example, by the known formation density and sound speed) using the equations above depending on the sensor location. All the parameters in these equations, except the mud cake attenuation decrement $\delta_{mc}$ are either known or estimated during the procedure above.

To measure the acoustic impedance one should bear in mind that the signal amplitude is important and the necessity of accounting for the measurement dynamic range arises. To reduce the requirements, one of the possible options is introduction of reference borehole measurements. For example, obtaining reflection from the known surface followed by comparing with the echo from mud cake/formation interface. Therefore it may be possible to avoid direct comparison with the signal from the source, and the dynamic range requirements reduce to a more reasonable value of 10-20 dB and improved data quality may be expected.

Figure 2:
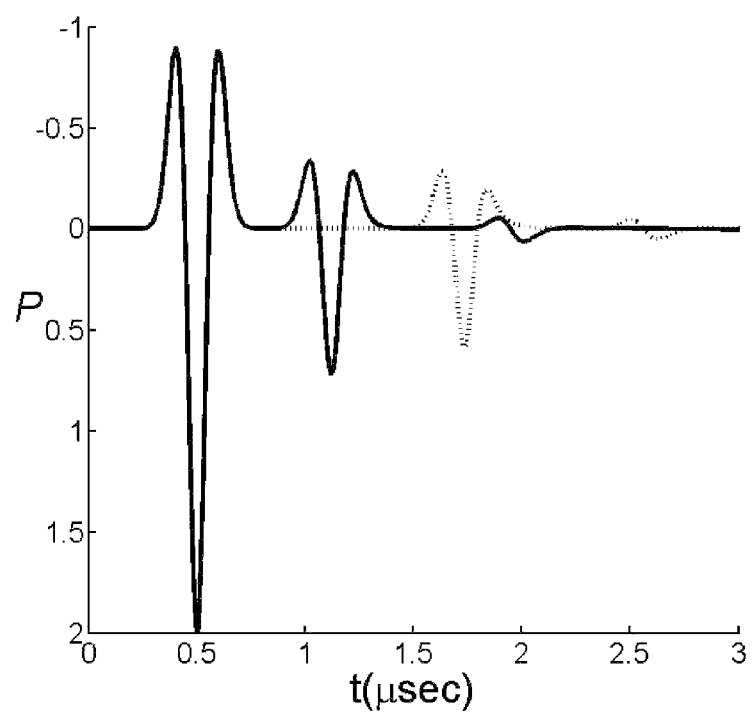
FIG. 2 shows pressure waves for a solid mud cake at different distances between a source and the mud cake.
Figure 3:
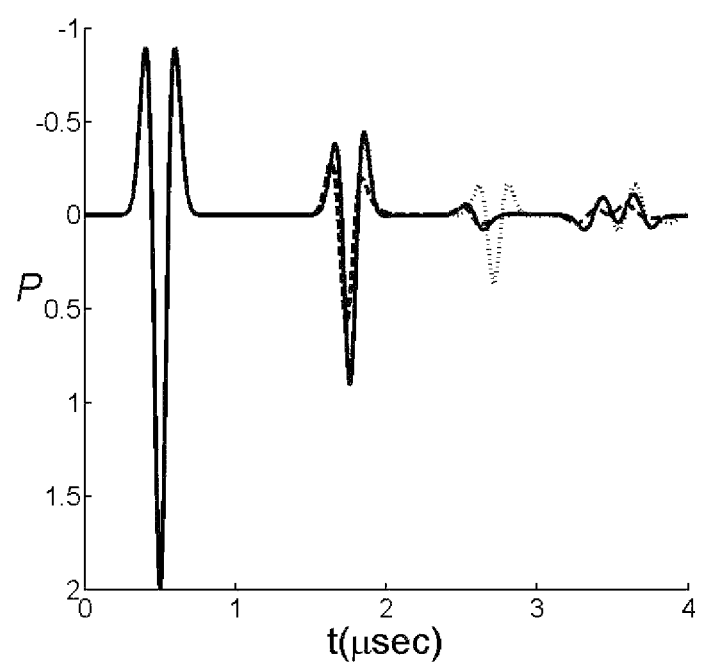
FIG. 3 illustrates pressure waves for the solid mud cake at different attenuation values at drilling mud/mud cake interface.

The illustration of the approach above with the numerically calculated waveforms as well as the drilling mud and mud cake attenuation effect are shown in FIGS. 2, 3 for the pressure waveforms normalized to the source signal amplitude. FIG. 2 shows pressure waves for the solid mud cake at different distances between the source and mud cake (1mm—solid line, 0.5 mm—dotted line), FIG. 3 shows pressure waves for the solid mud cake at different attenuation values on the drilling mud/mud cake interface (no attenuation—dotted line, in the mud cake only—solid line, both in the drilling mud and mud cake—dashed line). The approach above enables obtaining a justified and reasonably accurate estimate of the mud cake thickness and attenuation. Besides, it is a method for the constant monitoring and enables identifying the mud cake onset.

It is preferable to reduce the frequency to the maximum extent possible simultaneously retaining the possibility of identifying the echo arrival time. It may be done even for the frequencies corresponding to the wavelengths about $h_{mc}$–$0.5h_{mc}$ and less. It enables retaining strong enough reflections and enable high impedance measurement accuracy. At a higher frequency (wavelength $h_{mc}$ and less) to measure the echo arrival time simple picking is sufficient. At lower frequencies more complicated signal processing techniques are recommended because the signal and echo begin overlapping. Similarly, a possibility of using a better signal analysis should be provided to identify the mud cake properties. For example, the mud cake will have natural resonance frequencies related to its thickness. They must be highlighted in the signal spectrum. Consequently, during the echo spectral analysis we obtain an additional method for $h_{mc}$ estimation.

As the high-frequency signals' source sensors like contact transducers, refracted ray transducers, shear wave transducers, hydrophones, rolling transducers etc. can be used. The hydrophones enable producing a pressure signal and may be used even when direct contact with the mud cake/formation is not desirable or impossible for some reasons; contact transducers may be used to produce directional (vector) signal that may help obtain more detailed data; refracted ray transducers may ensure a strong excitation in the required direction; rolling transducers may prove quite useful if continuous measurements are required because they constantly contact the interface in question etc. For the method implementation, for example, ultrasonic immersed emitters (hydrophones, surface acoustic wave transducers) from companies, such as Physical Acoustics Corporation (http://www.pacndt.com/index.aspx?go=products&focus=/multichannel/pcidsp.htm), B&K (http://www.bkhome.com/), Reson, (http://www.reson.com/sw7542.asp), Panametrics (http://www.olympus-ims.com/en/panametrics-ndt-ultrasonic, and Onda, Force technology etc., may be used.

What is claimed is:

1. A method for a mud cake thickness determination comprising:

sending short-time high-frequency signals into a formation by at least one transducer from at least two positions located at different distances from the mud cake, measuring amplitudes of the signals sent from the at least two positions and reflected from a drilling mud/mud cake interface by the at least one transducer, recording of arrival times of the reflected echo-signals by the at least one transducer, determining a mud cake impedance $Z_{mc}$ as $$Z_{mc} = Z_m \frac{1+\gamma}{1-\gamma},$$

wherein $Z_m$—a drilling mud impedance, $\gamma$ is determined as $$\gamma = K_{mmc}(d_m)\exp\left(\frac{d_m}{d_{m2}-d_{m1}}\frac{\ln A_{m1}}{\ln A_{m2}}\right),$$

$d_m$—a distance between the transducer and the drilling mud/mud cake interface, $K_{mmc}$—reduction of the amplitude of signal when a distance between the at least one transducer and the drilling mud/mud cake interface is $d_m$, $d_{m1}$, $d_{m2}$—distances between the positions from which the signals are sent and the drilling mud/mud cake interface, $A_{m1}$—the amplitude of the signal sent from the position located at the distance $d_{m1}$ from the drilling mud/mud cake interface and reflected from the interface, $A_{m2}$—the amplitude of the signal sent from the position located at the distance $d_{m2}$ $d_{m1}$ from the drilling mud/mud cake interface and reflected from the interface, determining a sound speed in the mud cake as $$V_{mc}=Z_{mc}/\rho_{mc}.$$

where $\rho_{mc}$—is a density of the mud cake, and determining the mud cake thickness $h_{mc}$ as $$h_{mc}=V_{mc}t/2,$$

where t is a time of the signal propagation in the mud cake.

2. The method of claim 1 wherein short-term high-frequency signals are sent by the at least one transducer moving to different positions against the mud cake.

3. The method of claim 1 wherein a contact transducer is used as the transducer.

4. The method of claim 1 wherein a shear-wave transducer is used as the transducer.

5. The method of claim 1 wherein a refracted ray transducer is used as the transducer.

6. The method of claim 1 wherein the high-frequency signals are sent by at least two transducers installed at different distances from the mud cake.

7. The method of claim 1 wherein a mud cake attenuation is additionally determined.

8. The method of claim 1 wherein echo-signals' spectral analysis is additionally performed.

* * * * *